Sept. 8, 1970  V. LEADER  3,527,037
RIDING MOWER GRASS CATCHER

Filed Feb. 19, 1968  2 Sheets-Sheet 1

INVENTOR.
VICTOR LEADER
Burd, MacLachron, Braddock,
Bartz & Schwartz
ATTORNEYS

Sept. 8, 1970 V. LEADER 3,527,037
RIDING MOWER GRASS CATCHER
Filed Feb. 19, 1968 2 Sheets-Sheet 2
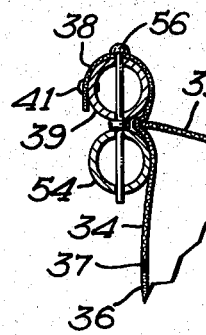
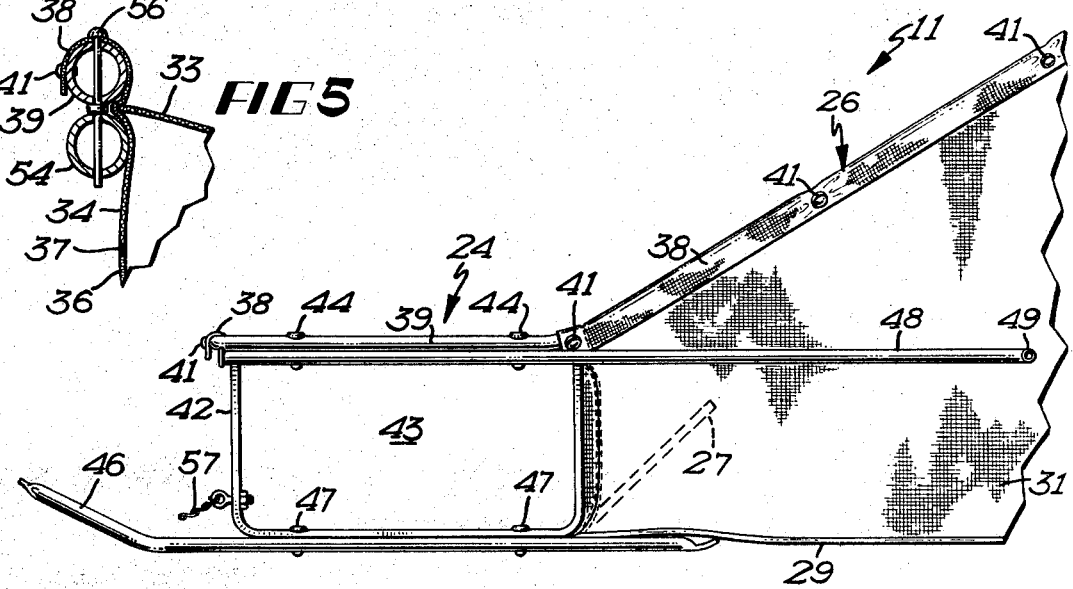
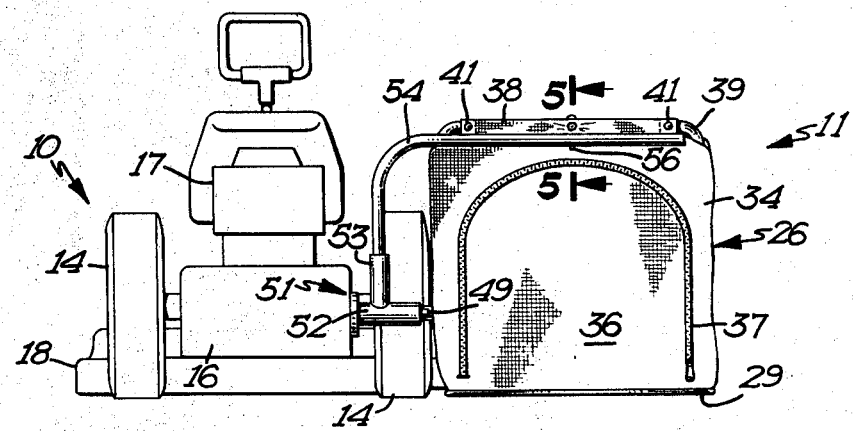
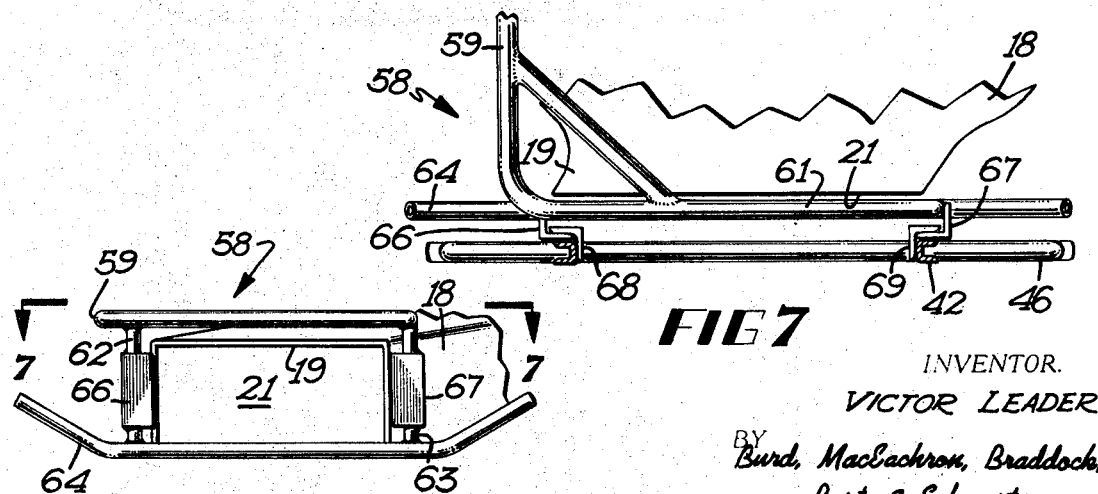
INVENTOR.
VICTOR LEADER
BY Burd, MacEachron, Braddock,
Bartz & Schwartz
ATTORNEYS 3,527,037
RIDING MOWER GRASS CATCHER
Victor Leader 2339 Sheridan Ave. N.,
Minneapolis, Minn. 55411
Filed Feb. 19, 1968, Ser. No. 706,297
Int. Cl. A01d 35/22, 53/06
U.S. Cl. 56—202                                    18 Claims

ABSTRACT OF THE DISCLOSURE

A riding rotary lawn mower equipped with a side grass catcher to receive and collect grass, leaves and other material discharged from the mower. The catcher has a transverse deflector plate which directs the material discharged from the mower upwardly into the back of the catcher and prevents a buildup of material in the front of the catcher. The catcher is pivotally mounted on the mower for independent floating movement to eliminate scalping by the mower. The rear of the catcher has a flap opened and closed by a zipper to provide a large discharge opening for the material collected in the catcher.

SUMMARY OF THE INVENTION

The invention relates to a grass catcher for collecting material discharged from a rotary lawn mower and the mounting structure used to connect the catcher to a side of the mower. The mounting structure allows the catcher to have movement independent of the cutting blade housing of the mower to eliminate scalping of the lawn and provide for quick and easy removal of the catcher from the mower. The catcher has a material receiving forward section having an inlet opening aligned with the discharge opening of the mower housing discharge chute and a rear grass storage section. A deflector means positioned between the forward section and the storage section of the catcher directs the material and air upwardly and rearwardly to fill the catcher from the rear. The catcher is connected to the side of the mower with pivotal mount means which allow floating movement of the catcher independent of the mower housing.

In the drawings:

FIG. 3 is an enlarged sectional view taken along the line 3—3 of FIG. 2;

FIG. 4 is a rear elevational view of the mower and grass catcher;

FIG. 5 is an enlarged sectional view taken along the line 5—5 of FIG. 4;

FIG. 6 is a plan view of a connection assembly for holding the inlet of the grass catcher aligned with the mower discharge chute; and FIG. 7 is a sectional view taken along the line 7—7 of FIG. 6.

Figure 1:
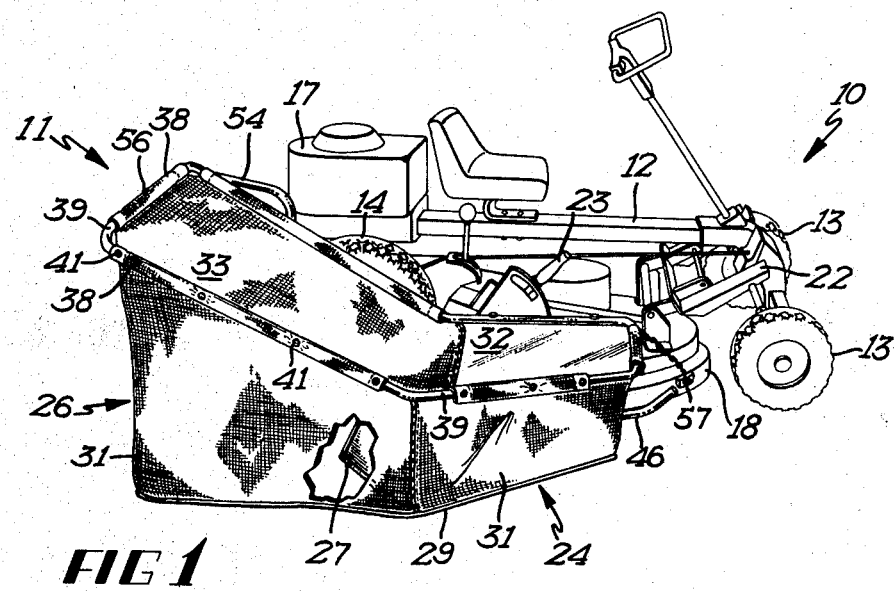
FIG. 1 is a perspective view of a riding lawn mower equipped with the grass catcher of the invention.

Referring to the drawings there is shown in FIG. 1, a riding rotary lawn mower indicated generally at 10 equipped with the grass catcher of the invention indicated generally at 11. The mower 10 has an elongated longitudinal frame 12 mounted on a pair of front steering wheels 13 and rear driving wheels 14. The rear portion of the frame is connected to a transmission 16 driven by an engine 17. Located between the front and rear wheels is a housing 18 enclosing a rotary cutting blade (not shown). A plurality of rotary blades may be enclosed within housing 18. Housing 18 has a side discharge chute 19 forming a lateral exit opening 21 to direct the grass clippings, leaves, cut material and other debris generally laterally of the direction of movement of the mower. The housing 18 is mounted to the mower frame by elevator linkage 22 controlled by a control lever 23. Mower 10 is a conventional riding lawn mower vehicle and may include garden tractors equipped with rotary lawn mowers having a side discharge chute.

The grass catcher 11 has a grass receiving forward section 24 and a rear grass storage section 26. Located between the sections 24 and 26 along the bottom of the catcher is an upwardly and rearwardly directed deflector or baffle 27 operable to direct the air and grass discharged from the mower housing 18 in upward and rearward directions. The baffle 27 also reduces the air flow area to form a venturi-like throat which increases the rate of flow of the air over the baffle thereby carrying the grass into the rear section 26 of the catcher. The deflector 27, extended upwardly, also acts as a stop or barrier which prevents the grass from moving back into the forward section 24 of the catcher. Baffle 27 is a flexible sheet or plate member, of plastic or sheet metal, secured to the bottom wall 29 transversely along the area between the forward section 24 and rear storage section 26. The baffle may be provided with releasable fasteners, as snaps, to releasably attach the baffle 27 to bottom wall 29.

Catcher 11 has a substantially flat sheet-like floor or bottom wall 29 which may be formed from a flexible plastic sheet material or sheet metal. Secured to the peripheral edges of the floor 29 are upright side walls 31. An air impervious top wall 32 secured to the side walls 31 covering the forward section 24 is joined to a second top wall 33 which covers the rear grass storage section 26. Side walls 31 and top wall 33 are formed of material, as woven strands of plastic or fiber, which allows air to flow through the catcher.

As shown in FIG. 4, the back of the catcher has a rear wall 34 having an inverted U-flap or door 36 providing a large access opening into the interior of the grass storage section 26. A zipper 37 releasably attaches the sides and top of door 36 to the back wall 34.

Referring to FIG. 1, the forward section 24 has an outer side directed outwardly and rearwardly so that the grass receiving chamber of the forward section 24 increases in width toward the rear of the catcher. The grass storage area also diverges rearwardly and upwardly forming a large capacity storage chamber. The frame 39 is directed upwardly and rearwardly to support the bag in an open position with maximum width and height. Fasteners 41, as releasable snaps or pins, shown in FIGS. 1 to 4, connect the top wall 32, 33 to the frame 39.

As shown in FIG. 3, the forward section 24 has a rectangular frame member 42 defining a rectangular grass inlet opening 43. A plurality of fasteners 44, as bolts, rivets and the like, are used to attach the top of the frame 39 to rectangular member 42. An elongated runner or skid 46 having an upwardly turned forward end is secured to the bottom of the member 42 by fasteners 47, as bolts, rivets and the like. The rear end of runner 46 has an upwardly turned tip to prevent the runner from digging into the ground or turf on backing up of the lawn mower and catcher.

The catcher 11 is attached to the side of the rear portion of the mower 10 by a pivotal mount indicated generally at 51. Mount 51 has a pair of arms 48 and 54 and an outwardly directed transverse support sleeve 52 pivotally receiving a transverse projection 49 of the forwardly directed arm 48. As shown in FIG. 3, arm 48 is secured to frame 39 along the top of member 42. Secured to the top of sleeve 52 is an upright support sleeve 53 swingably carrying second arm 54 for pivotal movement about a generally upright axis. Arm 54 extends upwardly and rearwardly under the rear transverse portion of the frame 39. As shown in FIG. 5, a downwardly directed pin 56 projects through suitable holes in the arm 54 to releasably attach the rear of the catcher to the arm 54. In this manner arm 54 supports the rear top of the frame 39 so that the storage section 26 has a maximum grass storing capacity.

Figure 2:
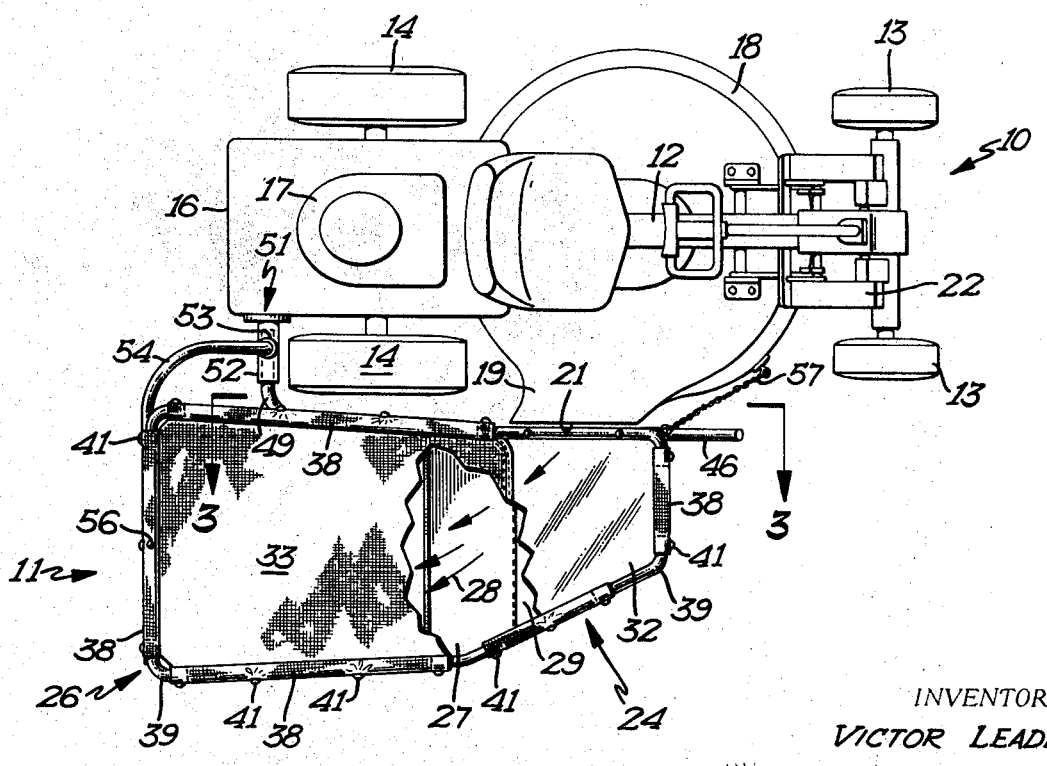
FIG. 2 is a plan view of the mower and grass catcher of FIG. 1.

As shown in FIG. 2, the forward end of the catcher is connected to a forward portion of the housing 18 by a flexible link 57. Link 57 holds the catcher in alignment with the discharge opening 21 of the chute 19 so that the grass is directed into the inlet opening 43 of the catcher. The end chute 19, as shown in FIG. 2, is slightly spaced from the catcher to allow the housing to have independent movement thereby avoiding scalping of the lawn. The catcher pivots about the generally transverse axis of the sleeve 52 so that the forward portion of the catcher can ride up and down with the contour of the lawn thereby keeping the catcher inlet opening 43 in substantial alignment with the discharge opening of the chute 19.

Referring to FIGS. 6 and 7, there is shown a modified connection of the front end of the catcher to the lawn mower. The flexible link 57 is replaced with an upwardly floating mount indicated generally at 58. Secured to the side of the mower frame is an outwardly directed arm 59 having a forward section 61 located above and ajacent the discharge chute 19. Secured to the forward section 61 are downwardly directed posts 62 and 63. A longitudinal skid or runner 64 is secured to the lower ends of the posts 62 and 63 providing a skid which is independent of the moving of the mower housing 18. Angle members 66 and 67 having inwardly directed facing flanges are secured to the posts 62 and 63 respectively to provide upright guide channels or ways which allow the front end of the grass catcher to freely move in up and down directions. As shown in FIG. 7, the upright sides of the rectangular member 42 of the grass catcher has outwardly directed angle members 68 and 69 having flanges which are located in the guide ways of the angle members 66 and 67. This lap connection structure allows the grass catcher bag to float in up and down directions and still maintain the lateral position of the catcher relative to the discharge opening of the mower chute 19. Stops (not shown) may be attached to the posts or angle members 66, 67 or 68, 69 to limit the downward movement of the catcher.

In use, the catcher 11 is connected to the side of the mower 10 by inserting the transverse projection 49 of the first arm 48 into the end of sleeve 52. The second arm 54 is placed in the upright sleeve 53 and swung around under the back transverse portion of frame 39. The pin 56 is inserted through the hole in the midsection of the arm 54 to hold the arm 54 in assembled relation with the frame 39 and hold the projection 49 of the arm 48 in the sleeve 52. The arm 48 being pivoted about a transverse axis is free to move up and down so that the runner 46 can follow the contour of the ground. The flexible link 57 connected to housing 18 holds the forward section 24 aligned with the discharge opening 21 of the housing chute 19.

On operation of the mower, the rotating cutting blade or blades within housing 18 propel material, as grass clippings, leaves and other debris, out through the exit or discharge opening 21 of the housing and through the opening 43 in the grass catcher bag into the grass receiving forward section 24. As indicated by arrows 28 in FIG. 2, the material is deflected upwardly by the transverse deflector plate 27 into the grass storage section 26. The deflector plate 27 extends upwardly in the direction of the upwardly extending top wall providing a reduced area between the forward sections 24 and the rear section 26. This creates a venturi throat which causes the velocity of the air flowing through the bag to increase at the throat. This increased velocity of the air carries the material upwardly and rearwardly to the back portion of the bag. The result is that the bag fills from the back to provide maximum capacity of the bag. The deflector 27 also functions as a stop or baffle to prevent the material from flowing back into the forward section 24.

To empty the bag as shown in FIG. 4, the zipper 37 is opened to provide a large exit opening into the back of the bag. The flap 36 being flexible will fold down enabling the grass to be removed or dumped from the catcher.

While there have been shown and described a grass catcher and mount structure for coupling the grass catcher on the side of a riding lawn mower, it is to be understood that various changes and omissions may be made by those skilled in the art without departing from the scope of the invention. For example, the arms 48 and 54 may be mounted to a support on the rear portion of the tractor if there is insufficient room on the side because of the drive wheels of the vehicle. The arm 54 may be inserted into an upright tubular member or telescoped over an upright rod mounted on the rear of the mower. The upper portion of the arm 54 can extend over the top of the frame 39. A spring or hook can be used to releasably connect the rear of the frame 39 to the arm 54. Furthermore, the side grass catcher is particularly suitable for the garden type tractors equipped with rotary lawn mowers. The invention is defined in the following claims.

The embodiments of the invention in which an exclusive property or privilege is claimed are defined as follows:

1. A grass catcher for collecting material discharged from a lawn mower comprising: a floor, a top wall located above and spaced from the floor, side walls joined to the floor and a top wall forming a material collecting chamber, a rear wall closing the chamber, an inlet opening in a forward section of the catcher to receive material discharged from the mower and deflector means forming part of the forward portion of the catcher to direct material to the rear of the catcher and mount means having coacting relatively movable members for connecting the catcher to the mower, whereby the catcher has floating movement substantially independent of the mower.

2. The catcher of claim 1 wherein the floor is generally flat, said top wall having an upwardly directed rear portion joined to a generally flat forward portion, said deflector means having a section located below the portion of the top wall joining the rear portion with the forward portion.

3. The catcher of claim 1 including frame means surrounding and connecting to the top wall.

4. The catcher of claim 3 including releasable connectors attaching the top wall to the frame means.

5. The catcher of claim 1 wherein the rear wall includes an inverted U-shaped flap and zipper means for holding the flap closed with the remainder of the rear wall.

6. The catcher of claim 1 wherein the deflector means is formed from a substantially flat sheet-like member.

7. The catcher of claim 1 wherein the inlet opening is in a side portion of the forward section of the catcher and frame means surrounding the inlet opening, said floor, said side walls and top wall secured to the frame means.

8. The catcher of claim 7 including a longitudinal runner secured to the bottom of the frame means.

9. The catcher of claim 1 wherein said mount means includes a first forwardly projected arm secured to the forward section of the catcher, and a second arm supporting the rear of the catcher.

10. The catcher of claim 9 wherein said mount means includes means pivotally mounting the first arm on the mower for movement about an axis transverse to the direction of movement of the mower.

11. The catcher of claim 9 wherein said mount means includes means swingable mounting the second arm on the mower.

12. The catcher of claim 9 including frame means surrounding and connected to the top wall and means releasably connecting the second arm to the frame means.

13. A grass catcher for collecting material discharged from a lawn mower comprising: a bag having a forward section within an inlet opening and a rear grass collecting section, frame means supporting the bag, mount means for connecting the frame means to the mower, said mount means including a first forwardly projected arm secured to the forward section of the frame means, a second arm supporting the rear of the frame means, and support means mounting the first arm and second arm on the mower.

14. The catcher of claim 13 wherein said support means includes a first member pivotally mounting the first arm for movement about an axis generally transverse to the direction of movement of the mower and a second member swingably mounting the second arm.

15. The catcher of claim 13 including means releasably connecting the second arm to the rear of the frame means.

16. The catcher of claim 13 including coupling means connecting the forward section of the frame means to the mower to allow substantially free up and down floating movement of the forward section of the bag.

17. The catcher of claim 16 wherein the coupling means comprises upright guide means connected to the mower and members secured to the frame means coacting with the upright guide means to provide for the substantially free up and down floating movement of the forward section of the bag.

18. The catcher of claim 1 wherein the deflector means is secured to a portion of the forward section of the catcher.

References Cited

UNITED STATES PATENTS

| | | | |
|---|---|---|---|
| 1,029,527 | 6/1912 | Bonham | 56—199 |
| 2,361,637 | 10/1944 | Lathrop | 56—199 |
| 2,783,604 | 3/1957 | Cahill | 56—202 |
| 2,855,744 | 10/1958 | Phelps | 56—202 |
| 2,932,146 | 4/1960 | Campbell | 56—202 |
| 3,002,332 | 10/1961 | Shane | 56—203 |
| 3,112,598 | 12/1963 | Heth et al. | 56—202 |
| 3,143,842 | 8/1964 | Mattson et al. | 56—202 |
| 3,212,248 | 10/1965 | Leader | 56—202 |
| 3,257,788 | 6/1966 | Pirie | 56—202 |
| 3,386,234 | 6/1968 | Leader | 56—202 |

FOREIGN PATENTS 258,719   5/1963   Australia.

RUSSELL R. KINSEY, Primary Examiner